US012576615B2

(12) United States Patent　　　(10) Patent No.: US 12,576,615 B2
Etzlstorfer　　　(45) Date of Patent: Mar. 17, 2026

(54) DEVICE FOR STORING OR GUIDING HYDROGEN AND PROCESS FOR THE PREPARATION THEREOF

(71) Applicant: VOESTALPINE STAHL GMBH, Linz (AT)

(72) Inventor: Christoph Etzlstorfer, Grünbach (AT)

(73) Assignee: Voestalpine Stahl GmbH, Linz (AT)

( * ) Notice: Subject to any disclaimer, the term of this patent is extended or adjusted under 35 U.S.C. 154(b) by 0 days.

(21) Appl. No.: 18/681,127

(22) PCT Filed: Aug. 17, 2022

(86) PCT No.: PCT/EP2022/072957
　　§ 371 (c)(1),
　　(2) Date: Feb. 5, 2024

(87) PCT Pub. No.: WO2023/025632
　　PCT Pub. Date: Mar. 2, 2023

(65) Prior Publication Data
　　US 2024/0278534 A1　　Aug. 22, 2024

(30) Foreign Application Priority Data

Aug. 25, 2021　(DE) ..................... 10 2021 122 024.6

(51) Int. Cl.
　　*B32B 15/01*　　(2006.01)
(52) U.S. Cl.
　　CPC ......... *B32B 15/011* (2013.01); *B32B 2255/06* (2013.01); *B32B 2255/205* (2013.01); *B32B 2255/26* (2013.01); *B32B 2311/30* (2013.01); *B32B 2439/00* (2013.01)

(58) Field of Classification Search
　　None
　　See application file for complete search history.

(56) References Cited

U.S. PATENT DOCUMENTS

| | | | |
|---|---|---|---|
| 2015/0231684 | A1 | 8/2015 | Floth et al. |
| 2018/0149312 | A1 | 5/2018 | Crier et al. |
| 2020/0243882 | A1 | 7/2020 | Schauer et al. |

FOREIGN PATENT DOCUMENTS

| | | |
|---|---|---|
| AT | 003144 U1 | 10/1999 |
| CN | 103672387 A | 3/2014 |
| CN | 112856206 A | 5/2021 |
| DE | 19749950 C2 | 11/1999 |

(Continued)

OTHER PUBLICATIONS

Machine translation of (JP 4700263 B2) via patents.google.com, accessed Feb. 15, 2025 (Year: 2011).*

(Continued)

*Primary Examiner* — Elizabeth Collister
(74) *Attorney, Agent, or Firm* — Maxwell J. Petersen; FisherBroyles. LLP

(57) ABSTRACT

The present invention relates to a device for storing or conducting hydrogen, in particular a hydrogen tank or hydrogen line, wherein the device is constructed in multiple layers from an inner side oriented toward the hydrogen to an outer side, wherein a layer located further inside has a lower diffusion coefficient (D) for hydrogen than the respective subsequent layer $D_{inside} < D_2 < \ldots < D_n$.

17 Claims, 6 Drawing Sheets

(56)                    References Cited

FOREIGN PATENT DOCUMENTS

| DE | 102008039573 | A1 |   | 4/2009 | | |
|----|--------------|----|---|--------|---|---|
| DE | 102016201337 | A1 |   | 8/2017 | | |
| DE | 112016001409 | T5 |   | 12/2017 | | |
| DE | 102017204240 | A1 |   | 9/2018 | | |
| JP | S54107453 | A |   | 8/1979 | | |
| JP | S61123496 | A |   | 6/1986 | | |
| JP | 2000314498 | A | * | 11/2000 | .............. | G01P 1/026 |
| JP | 2004324800 | A |   | 11/2004 | | |
| JP | 4700263 | B2 |   | 6/2011 | | |
| JP | 2019044890 | A |   | 3/2019 | | |
| JP | 6500087 | B2 |   | 4/2019 | | |
| JP | 2020515775 | A |   | 5/2020 | | |
| KR | 10-2019-0122828 | |   | 10/2019 | | |

OTHER PUBLICATIONS

Machine translation of JP 2000314498A via EPO (translated Jun. 27, 2025) (Year: 2003).*

Jo et al., Strong resistance to hydrogen embrittlement via surface shielding in multi-layered austenite/martensite steel sheets, Materials Science and Engineering: A, vol. 800, 2021, pp. 1-10 (Year: 2021).*

International Search Report for PCT/EP2022/072957, dated Nov. 24, 2022.

Written Opinion for PCT/EP2022/072957, dated Nov. 24, 2022.

German Search Report for DE 10 2021 122 024.6, dated 2022-05023.

Min Cheol Jo et al., "Strong Resistance To Hydrogen Embrittlement Via Surface Shielding In Multi-Layered Austenite/Martensite Steel Sheets," Material Science & Engineering, A 800 (2021) 140319, 10 pages.

Zhenzhou Wang et al., "A Review of Metallic Tanks for H2 Storage with A View To Application In Future Green Shipping," international Journal of hydrogen Energy 46 (2021), 6151-6179, 29 pages.

Office Action in related Japanese Application 2024-511993, dated May 13, 2025.

English Translation of Office Action in related Japanese Application 2024-511993, dated May 13, 2025.

* cited by examiner

Tank inside          D1 << D2          Outside

H concentration

Material cross-section
– – – – Critical concentration $D_i$ $D_o$ $t_i$          $t_o$ Inside layer          Outside layer

DEVICE FOR STORING OR GUIDING HYDROGEN AND PROCESS FOR THE PREPARATION THEREOF

RELATED APPLICATIONS

This patent application is a 35 U.S.C. § 371 National Stage entry of PCT/EP2022/072957, filed Aug. 17, 2022, which in turn claims priority based on German Patent Application DE 10 2021 122 024.6, filed Aug. 25, 2021, the disclosures of which are incorporated herein by reference.

FIELD OF THE INVENTION

The invention relates to a device for storing or conducting hydrogen and a method for producing it.

BACKGROUND OF THE INVENTION

Hydrogen is becoming increasingly important as an energy source, particularly in the replacement of fossil fuels in mobility, but is also used in the direct reduction of iron ores or in fuel cells for generating electricity.

In addition, there are numerous applications in technology in which hydrogen, in whatever form, is released and can have an effect on materials used in technology. This primarily includes deep drilling technology, but also acid-proof construction and the entire natural gas and petroleum sector.

The storage of hydrogen, but also the presence of hydrogen in technical processes, presents a challenge.

When using hydrogen as a fuel for direct combustion in appropriately equipped internal combustion engines and for generating electricity in fuel cells, but also when storing hydrogen for the direct reduction of iron ore, for example, suitable storage facilities and storage methods are required. But of the many possible fuels, hydrogen clearly has a massive hazard potential.

When it escapes, hydrogen forms a flammable mixture with the ambient air and if the hydrogen content is greater than 18%, a mixture of hydrogen and oxygen forms that can even be explosive.

Hydrogen has the smallest size of all atoms and is therefore able to diffuse through a variety of materials, making a number of materials unsuitable for containers that would be perfectly suitable for conventional fuels. The diffusion process is further intensified by high temperatures on the one hand or high internal pressure on the other. A particular problem occurs with metallic containers since they are subject to what is commonly called hydrogen embrittlement. This means that the material becomes brittle over time and is therefore no longer able to provide sufficient stability to resist intruding loads, for example. Although this effect does not in fact occur with plastic envelopes, many possible plastic materials are nevertheless difficult to recycle.

If liquefied hydrogen is used, it can vaporize or outgas from containers, in which case countermeasures must be taken against an extreme increase in volume and thus an increase in pressure, particularly through the use of over-pressure valves, which can involve considerable losses of hydrogen.

In principle, the problems of storage in pressurized containers are considered solved today, but the known solutions are very complex and expensive and also relatively heavy. The above-mentioned problems arise correspondingly when hydrogen is conducted in corresponding pipelines.

These problems also occur, however, during the processing or extraction of hydrocarbon gases such as methane or natural gas, where hydrogen exposure can also occur.

In addition to storage as a liquid or pressurized gas, what are commonly called metal hybrid storage systems are also known in which hydrogen is stored in gaps of a metal lattice. Adsorptive storage is also known.

As already mentioned, metals suffer from embrittlement and particularly with steel, hydrogen-induced cracking or hydrogen embrittlement is known to occur. In this case, even small quantities of hydrogen on the order of ppm are enough to cause a component to fail prematurely. This embrittlement reduces strength over time, with metal materials having different hydrogen tolerances. A particular challenge here is that high-strength steel materials react in a particularly sensitive way to hydrogen embrittlement. This can be counteracted by making a container made of a metal, in particular steel, from a less strong material. But this means that such a container must have thicker walls in order to provide the required stability. This leads to increased weights and, in mobile applications, to higher fuel consumption due to the higher weight. In addition, the pressure at which the hydrogen is stored may be limited, thus also reducing storage capacity. Although tanks made of CFRP do have advantages in terms of storage, they are difficult to recycle and are also significantly more expensive than tanks made of metals. Although storage in metal hydrides does work in principle, it must be viewed critically when it comes to mobile applications, for example, because loading is a slow and difficult process.

Although hydrogen barriers are a possible solution, thin barrier layers are a risk because even minimal localized damage can lead to component failure and bursting of the tank. In addition, barrier layers have to be applied subsequently and entail an additional work step. To make matters worse, even these barrier layers are not 100% impermeable to hydrogen, meaning that atomic hydrogen will penetrate every material sooner or later. The chemical potential is responsible for the diffusion of hydrogen and for diffusion in general. Particles diffuse to the location of the lower chemical potential, thus balancing it out and reaching a more energetically favorable state. The local chemical potential for any element in a solid is determined by several factors, such as the chemical composition of the local structure and the temperature. The most important factor, however, is the concentration of the element itself.

According to the laws of diffusion, the diffusion of hydrogen through a wall also results in a concentration gradient toward the outside with corresponding localized areas in the material with a particularly low potential for hydrogen, where the hydrogen accumulates and causes excess concentrations. These localized excess concentrations are particularly dangerous for metal containers due to hydrogen embrittlement.

The $H_2$ molecules first attach themselves to the surface and dissociate to form atomic hydrogen and the atomic hydrogen penetrates the steel. Atomic hydrogen from the gas itself can also penetrate the material, but the particles are more likely to recombine before this occurs.

Galvanization, for example, is known as a barrier layer. As described above, galvanizing does partially prevent the penetration of hydrogen, but a thin zinc coating, which is typically in the low two-digit micrometer range, is susceptible to damage. A barrier, typically on both sides of steel sheets, also prevents hydrogen from coming back out of the material. With such materials, the hydrogen content in the material therefore increases over a longer period of time. If the critical hydrogen concentration is reached, this can lead to component failure due to hydrogen embrittlement, as already mentioned.

DE 10 2017 204 240 A1 discloses a monolithic component made of steel in which different layers are produced by selective hardening and nitriding from the inside. The aim is to produce different layers in order to enable reliable hydrogen storage. This is problematic, however, since the diffusion depth in the nitriding does not ensure an exact transition between materials. Similarly, selective cooling through a wall thickness is a difficult process that is hard to control. The smallest fluctuations in the analysis of the monolithic base body cause massive changes in the result. Although a component with two clearly defined layers of martensite and austenite is supposed to be formed in this document, such clearly defined layers are not formed, but instead walls are produced with a continuous transition between austenite and martensite, with bainite mixed phases and different proportions of residual austenite. Aside from the fact that such a process is considerably complex, it also cannot produce a component with defined properties.

U.S. Pat. No. 3,785,949 B1 relates to a tank with a large number of layers in which any pressure produced is to be discharged from the inside to the outside via valves. This is apparently intended to prevent overpressure or material failure by diverting the hydrogen. The diversion to the outer layers means that specifically the hydrogen-sensitive layers come into contact with the hydrogen and are subjected to mechanical stress. Further instability is provoked by the welded connection in the outer layers.

The problem of the invention is to create a device for storing or conducting hydrogen which is simple in design, can be produced in a simple and reliable manner, and also has high stability with very good hydrogen tolerance.

SUMMARY OF THE INVENTION

The problem is solved by a device with the features described and claimed herein.

Advantageous modifications are described and claimed herein.

Another problem is to create a method for producing the device that is easy to control, inexpensive, and reliable.

This problem is solved by a method with the features described and claimed herein.

Advantageous modifications are described and claimed herein.

The device according to the invention for storing or conducting hydrogen can be, for example, a tank for storing hydrogen, but also a line, in particular a pipeline, for conducting hydrogen with which the hydrogen is conducted to the container or from the container to a consumer. In particular, the device can also be a supply line for a cylinder of an internal combustion engine and the like.

When the term "container" is used in the following, this also refers to pipelines and devices for conducting the hydrogen in any embodiment and vice versa.

Unless otherwise stated, all weights or percentages provided below are percentages by weight.

According to the invention, a device for containing, storing, or conducting hydrogen is made of metals and in particular of steel and more particularly here of different steel grades. Thus, a multilayer structure made of metal is produced. This multilayer structure has at least two layers. According to the invention, an inner layer, i.e. a layer facing the hydrogen that is to be conducted or stored, is made of a material, in particular a steel material, with a low vulnerability to hydrogen and a low diffusion coefficient for hydrogen.

The metallurgically bonded outer material has a higher diffusion coefficient for hydrogen. Preferably, the metallurgically bonded outer material also has a significantly higher tensile strength than the material.

According to the invention, this results in a sharp drop in the hydrogen concentration of the inner, hydrogen-insensitive material. The concentration in the outer material is thus kept low. Due to the comparatively high diffusion coefficient of the outer layer, the hydrogen diffusing through the inner layer is quickly dissipated to the outside and the critical concentration of hydrogen in the outer material is not exceeded.

Thus, according to the invention, instead of attempting to prevent the inevitable entry of hydrogen, the entry of hydrogen is controlled and kept within a tolerable range. It is, of course, possible to use a plurality of metallurgically bonded layers instead of two layers which are bonded to each other, whereby, according to the invention, each additional outer steel layer must respectively have an even higher diffusion coefficient for hydrogen.

Preferably, the metallurgical bond between the materials is produced using a press-welding method. A well-known press-welding method is what is commonly called roll cladding, in which two or more layers, particularly of different steel grades, are rolled together. In contrast to the prior art, which attempts to achieve multiple layers through chemical influence, a press-welding method achieves a layer sequence with an exact definition of thickness and properties. In addition, such a known press-welding method ensures a pore-free boundary layer between the materials so that a recombination of atomic hydrogen in the bonding plane is also prevented.

The invention thus relates in particular to a device for storing or conducting hydrogen, in particular a hydrogen tank or hydrogen line, wherein the device is constructed in multiple layers from an inner side oriented toward the hydrogen to an outer side, wherein a layer positioned further toward the inside has a lower diffusion coefficient (D) for hydrogen than the respective subsequent layer $D_{inside} < D_2 < \ldots < D_n$.

In one modification, the thickness of the inner layer $(t_i)$ behaves as follows relative to the thickness of the adjacent layer $(t_2)$: $D_i * t_2 < D_2 * t_i$ In one modification, the layers are made of a steel material or a nickel-based alloy.

In one modification, the layers are metallurgically bonded to one another, press-welded, or jointly tube-drawn.

In one modification, the inside of the device has a liner made of a plastic and/or ceramic. The purpose of such a liner is to provide chemical corrosion protection.

In one modification, the outside of the device has an organic or metallic corrosion protection layer with a diffusion coefficient D for hydrogen that is lower than the diffusion coefficient of the outermost layer.

These can, for example, be polymer solutions such as rubber coatings or synthetic resin-based or acrylic-based paints. The suitability of metallic coatings depends very much on their composition and application method. For example, pure zinc has a very low diffusion coefficient in the austenite range, but as an alloy the diffusion coefficient varies by orders of magnitude and, with 12% Ni, reaches a diffusion coefficient for hydrogen of around $0.5*10^{-12}$. Measurements have also shown the influence of the application method: zinc corrosion protection coatings applied by PVD have demonstrated a very high permeability for hydrogen. Hot-dip galvanized or electrolytically galvanized corrosion protection measures should therefore be avoided and preference should be given to alternative application techniques or alternative alloy compositions of the corrosion protection layer or paint coatings.

In one modification, the multi-layer structure has a thickness of between 2 and 45 mm, with the innermost layer being at least 0.3 mm thick.

According to one modification, the yield strength of the strongest layer is >350 MPa, preferably >500 MPa, particularly preferably >650 MPa.

In one modification, a material with a proportionally lower diffusion coefficient for hydrogen, such as high-manganese austenitic TWIP, austenitic stainless steels, or nickel-based alloys, is provided as the material that comes into contact with the hydrogen on the inside.

In one modification, transformation-delayed hardened and tempered steels, hardenable boron-manganese alloys, or hardenable and temperable chromium-molybdenum alloys are provided as the outer and/or middle layer.

According to one modification, the following materials are positioned from the inside to the outside, whereby the third outer layer is optional:

| $1^{st}$ layer | TWIP | $2^{nd}$ layer | 38MnSi4 | $3^{rd}$ layer S355 | or |
| $1^{st}$ layer | 316L | $2^{nd}$ layer | 34CrMo4 | $3^{rd}$ layer S235 | or |
| $1^{st}$ layer | Alloy 625 | $2^{nd}$ layer | 42CrMo4 | $3^{rd}$ layer 340LA | or |
| $1^{st}$ layer | 304L | $2^{nd}$ layer | 34MnB5 | $3^{rd}$ layer 420LA | |

A further aspect of the invention relates to a method for producing a device for storing or conducting hydrogen, in particular a hydrogen tank or hydrogen line, wherein the device is formed in multiple layers from an inner side oriented toward the hydrogen to an outer side, wherein a layer located further inside has a lower diffusion coefficient (D) for hydrogen than the respective subsequent layer $D_{inside}<D_2< \ldots <D_n$, wherein at least two metallic layers are metallurgically bonded.

In one modification, the material for forming the device is roll clad, explosion clad, or jointly tube-drawn.

In one modification, a plastic or ceramic liner is applied to the inner layer oriented toward the hydrogen in order to prevent hydrogen dissociation. Compared to metals, however, a plastic liner is intrinsically permeable to hydrogen.

In one modification, a metallic or organic corrosion protection layer made of a material with a lower diffusion coefficient than the outer layer is applied to the outside of the outer layer.

In one modification, each layer of the material is welded in the same way to form a closed container or to connect pipe sections so that the weld seam has a material structure comparable to the rest of the body.

In one modification, the layers of the material are welded using HF or MIG/MAG or TIG welding. These welding methods enable the respective layers to be welded in the same way with suitable preparation of the edges. By contrast, a separate joining of the material layers is not possible with laser welding.

A further aspect relates to the use of the device as a stationary hydrogen tank for storing generated hydrogen or as a hydrogen tank for stationary internal combustion engines for generating electricity and heat or as a hydrogen tank for use in a building heating system or as a hydrogen tank for storing hydrogen for use in a direct reduction system for metal ores.

A further aspect relates to the use of the device in mobile applications as a hydrogen tank in cars, trucks, agricultural vehicles, watercraft, and aircraft and in aerospace technology.

A further aspect relates to the use of the device as fuel supply lines and similar lines for supplying hydrogen to a combustion chamber or an injection device or a direct reduction system for metal ores or as a pipeline.

A further aspect relates to the use of the device in the field of deep drilling technology as part of the drill pipe, as liners or linings and pipes, in chemical plant construction both for conducting hydrogen and for tank and pipeline construction in areas where hydrogen exposure occurs.

Wherever hydrogen is referred to above, it should be noted that this also includes hydrogen exposure. Such exposure can also occur in the aforementioned methods and usages that deal with other gases such as methane or natural gas. This also includes the underground storage of such gases or of hydrogen or the synthesis of hydrocarbon gases.

BRIEF DESCRIPTION OF THE DRAWINGS

The invention will be explained by way of example with the aid of the drawings. In the drawings.

DETAILED DESCRIPTION OF THE INVENTION

Figure 1:
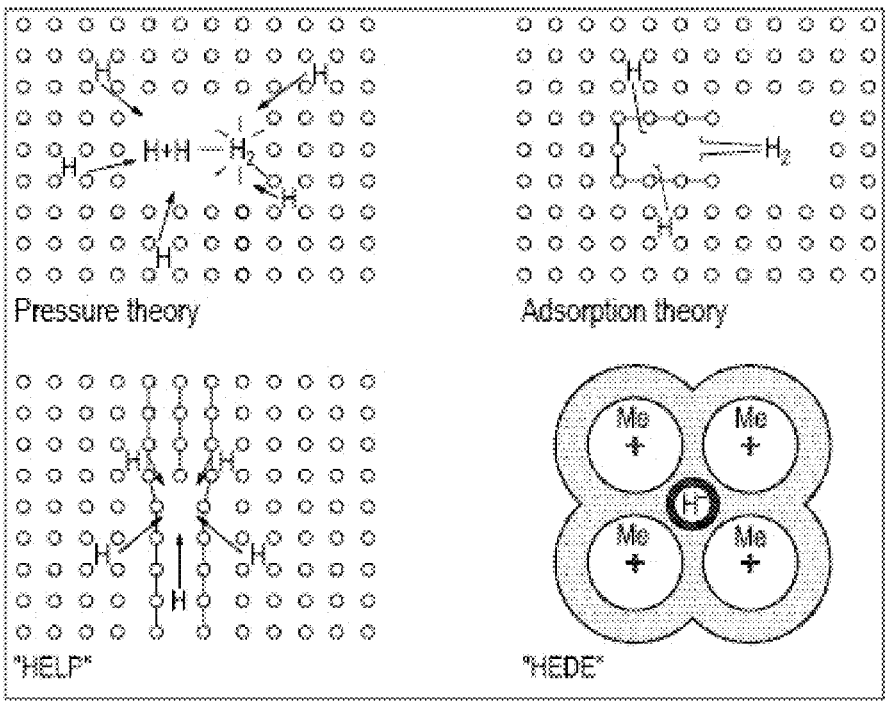
FIG. 1: shows theories about the mechanism of material damage by hydrogen.
Figure 2:
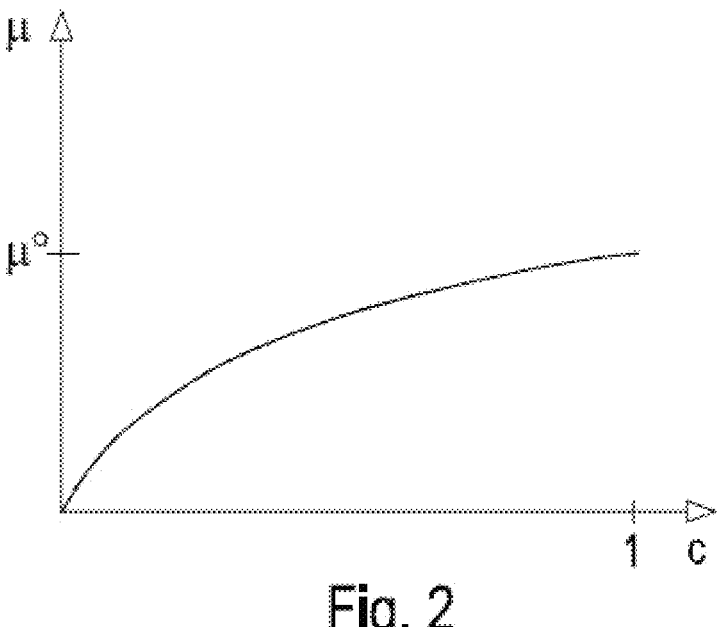
FIG. 2: shows the diffusion as a function of the chemical potential.

FIG. 2 shows the relationship between the chemical potential and the concentration.

Figure 3:
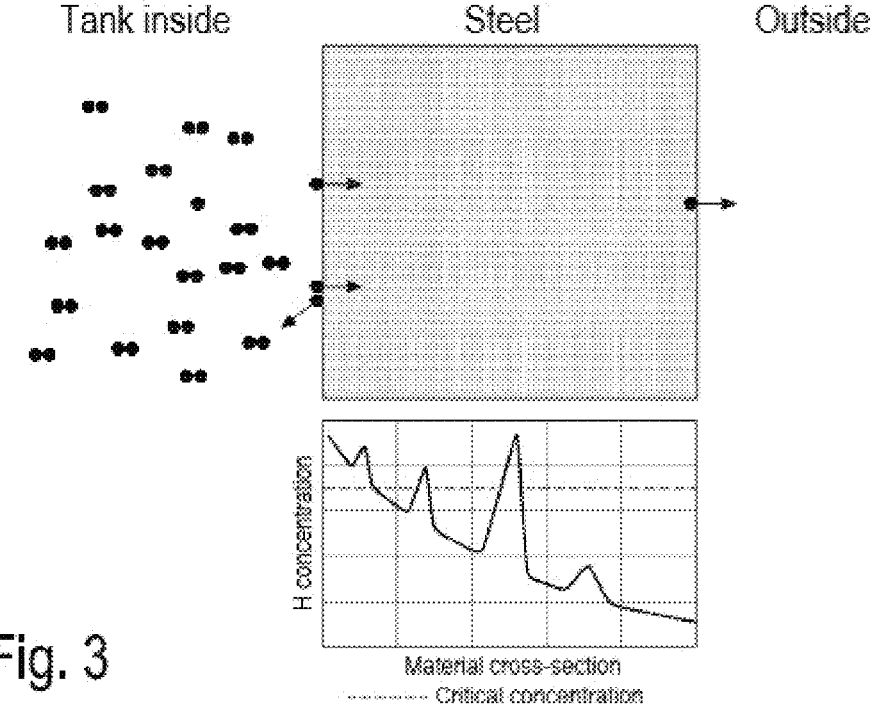
FIG. 3: shows the behavior of the hydrogen with the hydrogen concentration in a conventional steel container.

FIG. 3 shows the relationships in a single-walled, conventional steel container in which hydrogen molecules and atomic hydrogen are present on the inside of the container, which diffuse into the steel, but only a small proportion diffuses out again. The hydrogen molecules here first attach themselves to the surface of the coating and then dissociate to form atomic hydrogen, which penetrates the steel. The critical concentration that would cause damage to the steel material is depicted as a dotted line; the essential concentration of hydrogen is depicted as a solid line, which decreases toward the outside. As explained above, according to the laws of diffusion, the diffusion of hydrogen through a wall—in this case a single-walled steel container—results in a concentration gradient toward the outside, which is shown with the solid line. However, there are local points in the material with a particularly low potential for hydrogen, where hydrogen accumulates and causes increases in concentration. These points, which are commonly called hydrogen traps, then lead to the critical concentration being exceeded locally so that damage must be assumed to occur there.

Figure 4:
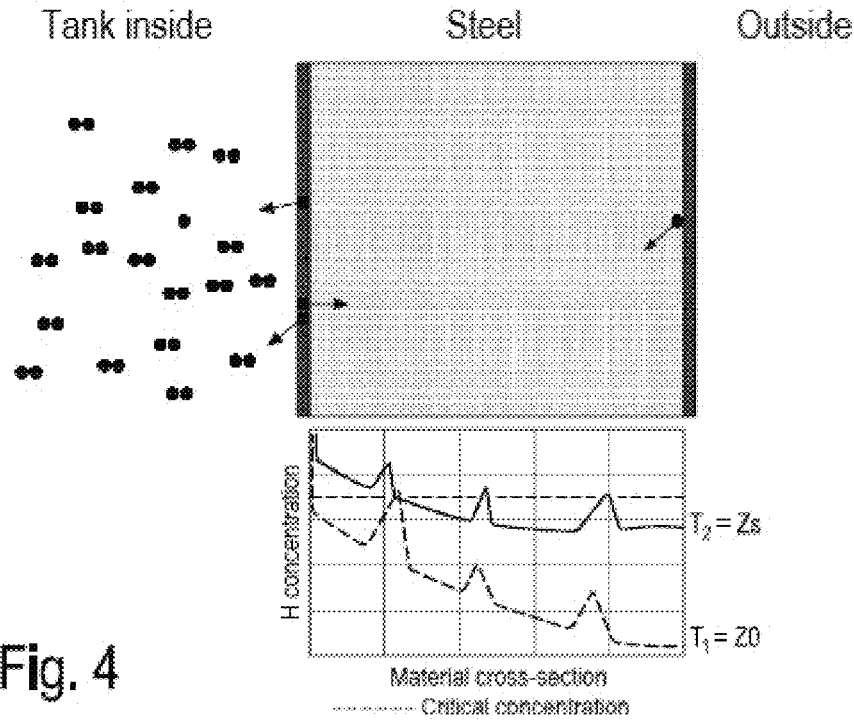
FIG. 4: shows the hydrogen concentration across the material cross-section for a material with a barrier layer on both sides.

FIG. 4 shows the corresponding states for a material, in particular steel material, which also has barrier layers such as metallic zinc layers. The concentration is indeed basically lower, which is evident from the fact that the initial concentration of hydrogen is basically lower, but the barrier on both sides prevents the hydrogen from escaping from the material, as can be seen here. Over a longer period of time, the hydrogen content in the material can therefore increase so that in the long term, the concentration gradient changes (upper curve) and in addition, the hydrogen traps mentioned above lead to the critical concentration being exceeded locally.

Figures 5, 6:
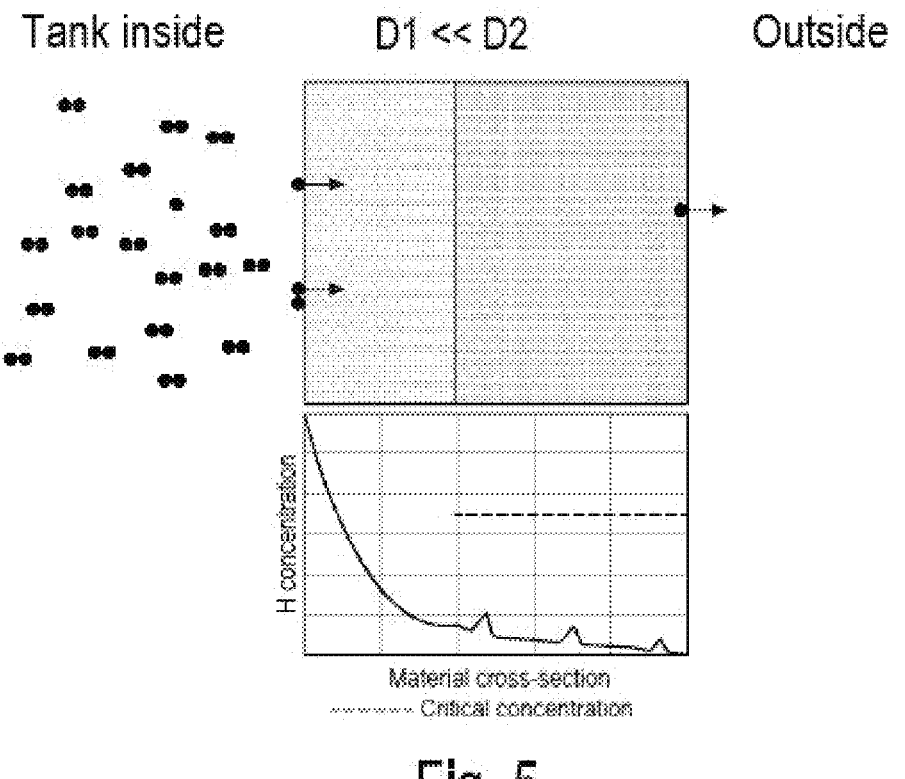
FIG. 5: shows the hydrogen distribution in a structure according to the invention.
FIG. 6: shows a highly schematic two-layer structure according to the invention.

FIG. 5 shows the conditions in a structure according to the invention. Two layers can be seen here, an inner layer, i.e. a layer that is oriented toward the hydrogen, and an outer layer that is oriented toward the outside. The inner material has a comparatively high resistance to hydrogen diffusion.

This is apparent from the curve and its very steep drop so that the hydrogen concentration decreases very sharply over the thickness of the material. At the same time, this material is comparatively insensitive to hydrogen damage. According to the invention, the outer material has an even higher diffusion coefficient for hydrogen than the inner layer so that hydrogen entering the outer layer from the inner layer is non-critically dissipated to the outside (FIG. 5, lower curve portion). Even the inevitable hydrogen traps do not lead to a critical concentration being exceeded in this case. The outer layer in this case is for example thicker and in particular, is made of a higher quality steel grade, which would be largely unsuitable as an inner layer, but ensures the mechanical stability of a corresponding container due to its high tensile strength and yield strength. This is particularly important for crash stability in mobile applications. On the one hand, it is comparatively easy to construct, is light-weight, and is also inexpensive to manufacture and on the other hand, it has high stability so that the sometimes extreme protective measures for the hydrogen container can at least be reduced.

FIG. 6 shows how the structure basically behaves; the layer thicknesses ($t_i$=thickness of the inner layer, $t_o$=thickness of the outer layer) and diffusion coefficients ($D_i$ and $D_o$) for hydrogen behave as follows:

$$D_i \times T_o < D_o \times t_i.$$

It is particularly advantageous if the inner layer has a lower material content for which $D_i$ is significantly smaller than $D_o$. This achieves a greater concentration gradient in the inner material and keeps the hydrogen concentration in the outer material low.

Figures 7, 8:
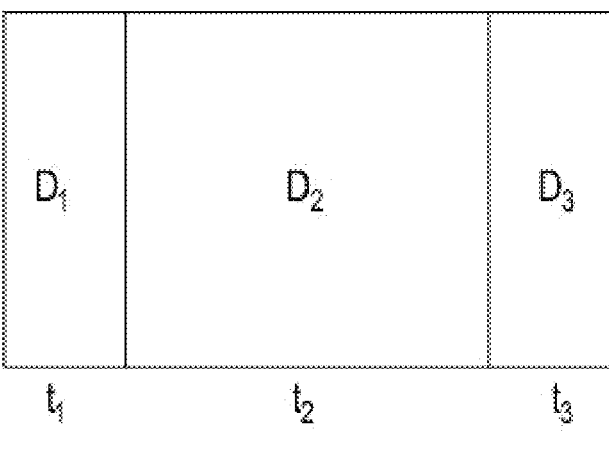
FIG. 7: shows a schematic representation of a three-layer structure according to the invention.
FIG. 8: shows a material bond between austenitic stainless steel and hardened and tempered steel produced by means of evacuated cladding packs in a view captured with an electron microscope.

Of course, as shown in FIG. 7, a three-part material is also conceivable in which the layer thicknesses and diffusion coefficients, as shown in FIG. 7, behave as follows:

$$D_i \times t_2 \leq D_2 \times t_i \text{ and } D_2 \times t_3 < D_3 \times t_2.$$

Such a layer arrangement is advantageous for example if the hydrogen concentration in the outer layer is to be further reduced or for processing reasons (simple joining of the outer layer). This can also be used to protect a high-strength but brittle layer $D_2$ from mechanical influences by means of a ductile outer layer $D_2$ if so desired.

The relation $D_1 < D_2 < D_3$ still applies so that the continuous drop in hydrogen concentration can occur primarily in the inner layer.

The diffusion coefficients for hydrogen in steel are primarily influenced by the structure and chemical composition. Diffusion is influenced by a number of other factors such as grain size distribution and phase composition. In the case of grain size distribution, this has a particular influence on lattice diffusion as opposed to grain size oxidation.

For the multilayer structure according to the invention, it therefore makes sense to individually determine the diffusion coefficients for the material used in order to obtain valid data. However, some general effects can be assumed and are explained below.

With regard to the chemical composition, i.e. the alloy in the case of steel, it can be stated that the alloying elements nickel, molybdenum, cobalt, silicon, sulfur, carbon, and chromium reduce the diffusion coefficient for hydrogen in steel. In other words, particularly the alloying elements that are also used in stainless steels. With regard to the structure, it can be stated that the diffusion coefficient in austenite is higher by a factor of $10^5$ than that of pure ferrite. The martensite and bainite phases here lie between the austenite and ferrite. It should be noted, however, that the actual diffusion rate depends heavily on the residual austenite content or the phase composition and the grain size.

For example, the diffusion coefficient of ferritic pure iron is $7 \times 10^{-9}$ m²/sec at room temperature. With a higher alloy content or carbon content, the diffusion coefficient decreases and is around $4.5 \times 10^{-10}$ m²/sec for an X65 steel and only $4.5 \times 10^{-13}$ m²/sec for an HSLA100.

As mentioned above, stainless steels do tend to have a lower diffusion rate for hydrogen, but the phase composition is decisive. For example, ferritic stainless steels achieve a diffusion coefficient of $5 \times 10^{-13}$ and higher, while that of martensitic stainless steels is slightly lower and that of austenitic stainless steels is $5 \times 10^{-16}$ m²/sec.

Accordingly, a material with a proportionally lower diffusion coefficient for hydrogen, such as high-manganese austenitic TWIP, austenitic stainless steels (e.g. 304L, 316L), or nickel-based alloys such as Alloy 625 or Alloy 825, is used as the inner material that comes into contact with the hydrogen.

An example of a grade with a high manganese content has the following composition, for example:

| | |
|---|---|
| Carbon (C) | 0.3-1 |
| Manganese (Mn) | 13-24 |
| Silicon (Si) | 0.01-2 |
| Aluminum (Al) | 0.03-2.5 |
| Chromium (Cr) | 0.03-2.5 |
| Titanium (Ti) | 0.01-0.08 |
| Nitrogen (N) | <0.04 |
| Phosphorus (P) | <0.03 |
| Sulfur (S) | <0.02 |
| Nickel (Ni) | <1 |

Residual iron and smelting-related impurities

For austenitic stainless grades, steels of the following alloy composition are suitable:

| | |
|---|---|
| Carbon (C) | 0.01-0.1 |
| Manganese (Mn) | 0.2-2.0 |
| Silicon (Si) | 0.01-1 |

-continued

| | |
|---|---|
| Chromium (Cr) | 16-20 |
| Titanium (Ti) | 0.01-0.08 |
| Nitrogen (N) | <0.05 |
| Phosphorus (P) | <0.04 |
| Sulfur (S) | <0.015 |
| Molybdenum (Mo) | 1-2.5 |
| Nickel (Ni) | 7-15 |

Residual iron and smelting-related impurities.

Suitable nickel-based alloys are alloys of the following composition:

| | |
|---|---|
| Carbon (C) | 0.01-0.1 |
| Manganese (Mn) | 0.01-1 |
| Silicon (Si) | 0.02-0.5 |
| Aluminum (Al) | 0.02-0.4 |
| Cobalt (Co) | <1 |
| Chromium (Cr) | 18-24 |
| Copper (Cu) | 0.05-3 |
| Iron (Fe) | <18 |
| Molybdenum (Mo) | 2-10 |
| Niobium | 3-4.5 |
| Titanium (Ti) | <0.04 |
| Phosphorus (P) | <0.02 |
| Sulfur (S) | <0.01 |

Residual nickel and smelting-related impurities.

Suitable outer and middle layers are transformation-delayed hardened and tempered steels, hardenable boron-manganese alloys, and hardenable and temperable chromium-molybdenum alloys. One possible alloy composition is the following, for example:

| | |
|---|---|
| Carbon (C) | 0.08-0.6 |
| Manganese (Mn) | 0.5-3.0 |
| Aluminum (Al) | 0.01-0.07 |
| Silicon (Si) | 0.01-0.7 |
| Chromium (Cr) | 0.02-2 |
| Titanium (Ti) | 0.01-0.08 |
| Nitrogen (N) | <0.02 |
| Boron (B) | 0.002-0.02 |
| Phosphorus (P) | <0.01 |
| Sulfur (S) | <0.01 |
| Molybdenum (Mo) | 0.01-0.5 |

Residual iron and smelting-related impurities.

If an additional outer layer is provided, ferritic grades such as IF steels, structural steels, or microalloyed grades are predominantly used here. The table below shows an example of a suitable microalloyed steel:

| | |
|---|---|
| Carbon (C) | 0.02-0.15 |
| Manganese (Mn) | 0.2-2.0 |
| Aluminum (Al) | 0.01-0.07 |
| Silicon (Si) | <0.5 |
| Chromium (Cr) | <0.3 |
| Titanium (Ti) + niobium (Nb) | 0.01-0.15 |
| Nitrogen (N) | <0.02 |
| Boron (B) | <0.02 |
| Phosphorus (P) | <0.01 |
| Sulfur (S) | <0.01 |
| Molybdenum (Mo) | <1 |

Residual iron and smelting-related impurities.

This results in the following possible arrangements, for example:

1. TWIP—38MnSi4 (+S355)
2. 316L—34CrMo4 (+S235)
3. Alloy 625-42CrMo4 (+340LA)
4. 304L—34MnB5 (+420LA)

In one example, the corresponding arrangement is roll clad, wherein a steel sheet stack is formed in an intrinsically known manner, heated to rolling temperature in a pusher furnace, and then hot-rolled and then cold-rolled. Tests on these clad plates have shown that the materials can withstand hydrogen exposure. As expected, there is no recombination of hydrogen in the bonding plane.

The hot-rolling cladding process is advantageously carried out with evacuated cladding packs that are sealed airtight in order to minimize oxide formation in the bonding plane during the process of the heating to rolling temperature. The metallographic sections in FIG. 8 show a material bond between the various possible materials.

It has turned out that with some material combinations, pure nickel layers in the cladding plane increase the adhesion in the cladding. The low thickness of the auxiliary layer and the relatively high diffusion coefficient of hydrogen in pure nickel ($10^{-10}$ m$^2$/sec) compared to that of the austenite reveal one reason for the use of the adhesion promoter according to the invention.

One possible embodiment is shown in the following example, which is only an example and should be understood as non-limiting.

A type 316L steel as the inner layer with a thickness of 2 mm and a composition in weight percent of:

C=0.016;
Cr=17.2;
Ni=10.2;
Mn=0.9;
Si=0.46;
Mo=2.03,
P=0.0025,
S=0.001,
N=0.035,
Residual iron and smelting-related impurities
with a diffusion coefficient for hydrogen of $5 \times 10^{-16}$ m$^2$/s and a steel of the type 34MoCr4 as the outer layer with a thickness of 10 mm with the following composition in weight percent:

C=0.35;
Mn=0.5;
Si=0.25;
Cr=1.04;
Mo=0.18;
S=0.015;
P=0.016,
Residual iron and smelting-related impurities
with a diffusion coefficient for hydrogen of $1 \times 10^{-13}$ m$^2$/s are roll clad together.

Figure 9:
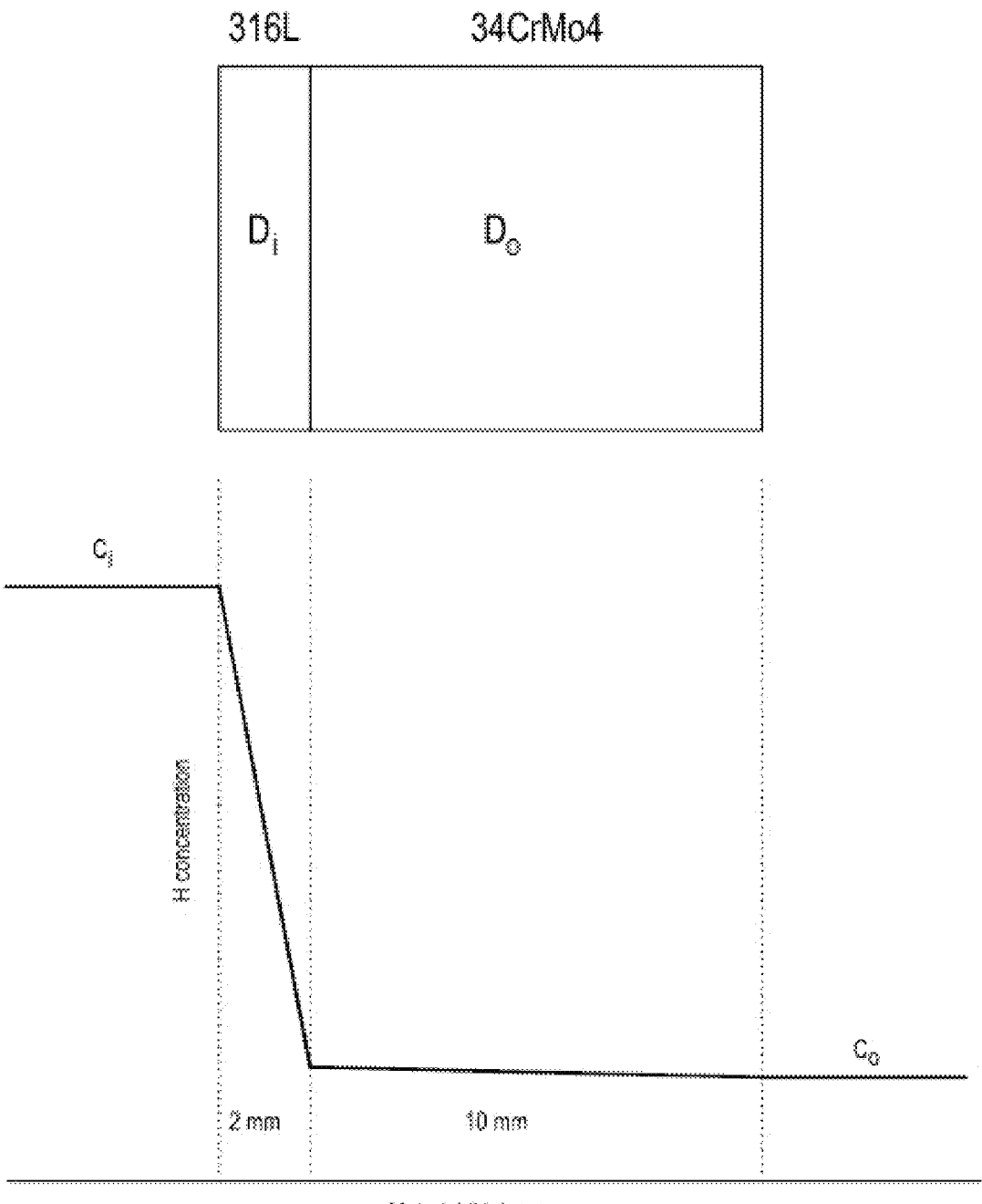
FIG. 9: is a very schematic depiction of the hydrogen concentration over the material thickness in a two-layer material structure.

The concentration of a diffusing medium into and through a wall can be represented approximately linearly in the stationary state, wherein the slope of the respective concentration gradient in the multilayer material is indirectly proportional to the diffusion coefficient. Thanks to the choice of cladding partners, the majority (approx. 97% of the total concentration gradient) of the hydrogen concentration in the above-mentioned example has already fallen off by the point at which the cladding level is reached and the hydrogen content is kept low in the outer layer. This is illustrated in FIG. 9.

Another non-limiting example involves a three-layer example with an inner layer made of the nickel-based Alloy 625 with a thickness of 0.5 mm and a composition in weight percent of:

C=0.013;
Al=0.2;
Si=0.16;
Cr=21.2;
Mo=8.2;
Ti=1.4;
Nb=3.6;
Residual nickel and inevitable production-related impurities with a diffusion coefficient for hydrogen of about $2 \times 10^{-15}$ m²/s, a second, middle layer made of a 42CrMo4 steel material with a thickness of 10 mm and a composition in weight percent of:

C=0.415,
Cr=0.99;
Mo=0.22,
Mn=0.6;
Si=0.19;
Residual iron and inevitable melting-related impurities with a diffusion coefficient for hydrogen of approx. $1.5 \times 10^{-13}$ m²/s and a third outer layer made of a 340LA steel material with a thickness of 3 mm and a composition in weight percent of:

C=0.079,
Si=0.02,
Mn=0.33,
Al=0.042,
Cr=0.02;
Nb=0.054,
B=0.0002;
Mo=0.003
Residual iron and inevitable melting-related impurities with a diffusion coefficient for hydrogen of around $4 \times 10^{-11}$ m²/s that are roll clad together. The distribution of the hydrogen can be calculated in this example as well.

Here too, approx. 78% of the hydrogen concentration has already been reduced in the inner layer made of Alloy 625. This already significantly reduces the hydrogen content in the middle layer. The micro-alloyed outer layer does not change the concentration gradients much, but its good weldability makes it possible to attach grips or handles.

Figure 10:
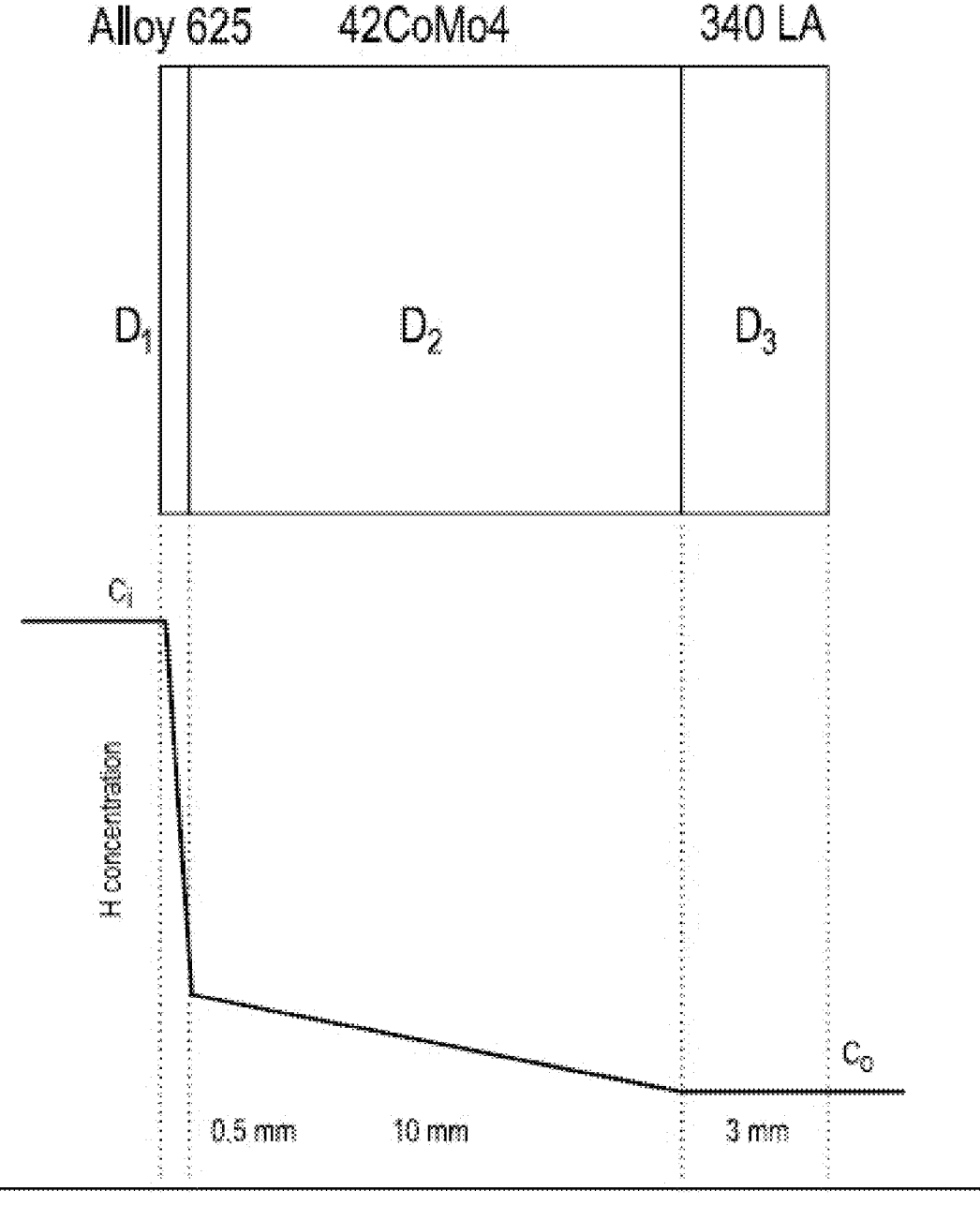
FIG. 10: is a very schematic depiction of the hydrogen concentration over the material thickness in a three-layer material structure.

This is illustrated in FIG. 10.

According to the invention, the correspondingly produced device can be used as a stationary hydrogen tank, i.e. for stationary internal combustion engines for generating electricity and heat, for example. A use as a hydrogen tank for utilization in a building heating system is also a matter of course with further implementation of the technology.

Furthermore, such a device can be used advantageously in mobile applications. These are in particular, but not exclusively, the use in cars, trucks, agricultural vehicles, watercraft, and aircraft, but also for applications in the aerospace industry in general.

Since the invention also includes the production of pipes, such pipes are provided on a smaller scale as fuel supply lines and similar lines for supplying hydrogen to a combustion chamber or an injection device or a direct reduction system for metal ores. In addition, however, such pipes can also be used on a larger scale as pipelines.

The positive properties are also advantageous, however, in the field of deep drilling technology as part of the drill pipe, as liners or linings and pipes, but also in chemical plant construction, both for conducting hydrogen and for tank and pipeline construction in areas where hydrogen exposure occurs. Hydrogen exposure occurs not only during the processing, extraction, or storage of hydrogen, but also during the processing, extraction, or storage of natural gas.

The invention thus makes it possible to create a device for storing and/or conducting hydrogen which can store or conduct hydrogen reliably and in a mechanically safe, durable way.

The method according to the invention makes it possible to produce such a device in a simple way, but above all on an industrial scale.

The invention claimed is:

1. A device for storing or conducting hydrogen, comprising:

at least an inner layer and an outer layer and, optionally, one or more intermediate steel layers;

the layers being arranged successively from an inside to an outside of the device;

each layer comprising at least one of steel and a nickel-based alloy;

each layer having a diffusion coefficient (D) for hydrogen diffusion;

wherein the diffusion coefficient (D) of each layer located closer to the inside of the device than an adjacent successive layer is less than the diffusion coefficient (D) of the adjacent successive layer;

the layers are bonded together using at least one of metallurgical bonding, press welding, and tube drawing; and the at least one of the outer layer and an intermediate layer comprises a transformation-delayed hardened and tempered steel, a hardenable boron-manganese alloy steel, or a hardenable and temperable chromium-molybdenum alloy steel.

2. The device according to claim 1, wherein each layer has a thickness (t), and the diffusion coefficient (D) of each layer located closer to the inside of the device multiplied by the thickness (t) of the adjacent successive layer is less than the diffusion coefficient (D) of the adjacent successive layer multiplied by the thickness (t) of the layer located closer to the inside of the device.

3. The device according to claim 1, wherein the layers have different alloy compositions.

4. The device according to claim 1, further comprising an inner liner made of a plastic or a ceramic material.

5. The device according to claim 1, further comprising an organic or metallic corrosion protection coating on the outer layer, the corrosion protection coating having a diffusion coefficient (D) that is less than the diffusion coefficient (D) of the outer layer.

6. The device according to claim 5, wherein the corrosion protection coating comprises at least one of a polymer coating, a synthetic resin-based or acrylic-based paint, and a zinc or zinc alloy-based coating.

7. The device according to claim 1, wherein the layers have a combined thickness of between 2 and 45 mm and the inner layer has a thickness of at least 0.3 mm.

8. The device according to claim 1, wherein at least one of the layers has a yield strength of greater that 350 MPa.

9. The device according to claim 1, wherein the inner layer comprises at least one of a high-manganese austenitic TWIP steel, an austenitic stainless steel, and a nickel-based alloy.

10. The device according to claim 1, wherein:

the device includes first, second, and optional third layers, the first layer being the inner layer, the second layer being the intermediate or outer layer and adjacent to the first layer;

and the first, second and optional third layers have one of the following sequences of steel composition: a) $1^{st}$ layer—TWIP, $2^{nd}$ layer—38MnSi4, $3^{rd}$ layer—S355, or b) $1^{st}$ layer—316L, $2^{nd}$ layer—34CrMo4, $3^{rd}$ layer—S235, or c) $1^{st}$ layer—Alloy 625, $2^{nd}$ layer—42CrMo4, $3^{rd}$ layer—340LA, or d) $1^{st}$ layer—304L, $2^{nd}$ layer—34MnB5, $3^{rd}$ layer—420LA.

11. A device for storing or conducting hydrogen, comprising:

at least an inner layer and an outer layer and, optionally, one or more intermediate steel layers;

the layers being arranged successively from an inside to an outside of the device;

each layer comprising at least one of steel and a nickel-based alloy;

each layer having a diffusion coefficient (D) for hydrogen diffusion;

wherein the diffusion coefficient (D) of each layer located closer to the inside of the device than an adjacent successive layer is less than the diffusion coefficient (D) of the adjacent successive layer;

the layers are bonded together using at least one of metallurgical bonding, press welding, and tube drawing; and the first, second and optional third layers have one of the following sequences of steel composition: a) $1^{st}$ layer—TWIP, $2^{nd}$ layer—38MnSi4, $3^{rd}$ layer—S355, or b) $1^{st}$ layer—316L, $2^{nd}$ layer—34CrMo4, $3^{rd}$ layer—S235, or c) $1^{st}$ layer—Alloy 625, $2^{nd}$ layer—42CrMo4, $3^{rd}$ layer—340LA, or d) $1^{st}$ layer—304L, $2^{nd}$ layer—34MnB5, $3^{rd}$ layer—420LA.

12. A method for producing a device for storing or conducting hydrogen, comprising the steps of:

providing at least an inner layer and an outer layer and, optionally, one or more intermediate layers;

the layers being arranged successively from an inside to an outside of the device;

each layer comprising at least one of steel and a nickel-based alloy;

each layer having a diffusion coefficient (D) for hydrogen diffusion;

wherein the diffusion coefficient (D) of each layer located closer to the inside of the device than an adjacent successive layer is less than the diffusion coefficient (D) of the adjacent successive layer and the at least one of the outer layer and an intermediate layer comprises a transformation-delayed hardened and tempered steel, a hardenable boron-manganese alloy steel, or a hardenable and temperable chromium-molybdenum alloy steel; and metallurgically bonding at least two of the layers together.

13. The method according to claim 12, wherein the metallurgical bonding comprises at least one of roll cladding, explosion cladding, and joint tube drawing.

14. The method according to claim 12, further comprising the step of applying a plastic or ceramic liner to the inner layer, in order to prevent hydrogen dissociation.

15. The method according to claim 12, further comprising the step of applying a metallic or organic corrosion protection coating to the outer layer, the coating having a lower hydrogen diffusion coefficient than the coefficient (D) of the outer layer.

16. The method according to claim 12, further comprising the step of welding the layers of the device to form a closed container or connected pipe sections.

17. The method according to claim 16, wherein the layers of the device are welded using at least one of HF welding, MIG/MAG welding, and TIG welding.

* * * * *